US005540835A

United States Patent [19]
Sanderson

[11] Patent Number: 5,540,835
[45] Date of Patent: Jul. 30, 1996

[54] GROWTH REGULATION OF ZEBRA MUSSELS THROUGH MAGNETIC WATER TREATMENT

[76] Inventor: Charles H. Sanderson, 2015 S. Calhoun St., Fort Wayne, Ind. 46857

[21] Appl. No.: 345,135

[22] Filed: Nov. 28, 1994

Related U.S. Application Data

[62] Division of Ser. No. 197,928, Feb. 17, 1994, Pat. No. 5,368,748.

[51] Int. Cl.$^6$ ........................................ C02F 1/48
[52] U.S. Cl. .................... 210/167; 210/194; 210/222; 210/416.1
[58] Field of Search ................... 210/222, 223, 210/695, 167, 194, 416.1; 422/6, 22; 123/41.44

[56] References Cited

U.S. PATENT DOCUMENTS

| | | | |
|---|---|---|---|
| 468,741 | 2/1892 | Cabell | 422/6 |
| 3,951,807 | 4/1976 | Sanderson | 210/222 |
| 4,050,426 | 9/1977 | Sanderson | 123/119 |
| 4,065,386 | 12/1977 | Rigby | 210/748 |
| 4,153,559 | 5/1979 | Sanderson | 210/222 |
| 4,299,700 | 11/1981 | Sanderson | 210/222 |
| 4,320,003 | 3/1982 | Sanderson | 210/222 |
| 4,357,237 | 11/1982 | Sanderson | 210/222 |
| 4,430,785 | 2/1984 | Sanderson | 29/157 |
| 4,455,229 | 6/1984 | Sanderson et al. | 210/222 |
| 4,658,597 | 4/1987 | Shum | 62/235.1 |
| 4,659,479 | 4/1987 | Stickler | 210/222 |
| 4,691,668 | 9/1987 | West | 123/41.44 |
| 4,728,306 | 3/1988 | Schneider | 440/1 |
| 5,040,487 | 8/1991 | Bollyky | 119/4 |
| 5,116,655 | 5/1992 | Ezoe | 422/6 |
| 5,192,451 | 3/1993 | Gill | 210/755 |
| 5,209,934 | 5/1993 | Ekis, Jr. | 210/754 |
| 5,240,674 | 8/1993 | Armor | 210/764 |
| 5,248,437 | 9/1993 | Forrest | 210/695 |
| 5,252,330 | 10/1993 | Lee et al. | 210/749 |
| 5,256,310 | 10/1993 | Brooks | 210/754 |
| 5,288,409 | 2/1994 | Herrle et al. | 210/764 |
| 5,294,351 | 3/1994 | Clum et al. | 210/764 |

FOREIGN PATENT DOCUMENTS 3116797  5/1988  Japan ................................ 210/222

Primary Examiner—Matthew O. Savage
Attorney, Agent, or Firm—Randall J. Knuth

[57] ABSTRACT

A method and apparatus in which water is magnetically treated to retard the growth of zebra mussels in water systems, thereby reducing the requirements and cost of water-system maintenance and the quantity of toxic chemical treatments released to the environment. The method includes removing a volume of water from a zebra mussel infested environment, magnetically treating the water, then returning the treated water back to the environment. The apparatus includes a permanent magnet of alternating polarity to form a magnetic field through which the water is treated.

8 Claims, 4 Drawing Sheets

GROWTH REGULATION OF ZEBRA MUSSELS THROUGH MAGNETIC WATER TREATMENT

This is a division of application Ser. No. 08/197,928, filed Feb. 17, 1994, now U.S. Pat. No. 5,368,748.

BACKGROUND OF THE INVENTION

The present invention generally relates to a method and apparatus for controlling or reducing the growth of zebra mussels.

The zebra mussel, *Dreissena polymorpha*, is believed to have been introduced into the Great Lakes of North America in the mid 1980's. The zebra mussel is native to Europe and is thought to have been transported to the Great Lakes watershed in the fresh water ballast of a trans-oceanic ship.

Most transplanted species are rather benign and have little apparent effect on the ecology of the new host system. Some are even beneficial. However, in this case, the introduced zebra mussel, has had negative impacts on the environment and constructions of man. The zebra mussel can clog water intakes and distribution pipelines for industrial and water supply facilities while also increasing the corrosion potential of the pipelines. Further, the mussel may encrust hulls of ships and populate the interiors of watercraft engines.

Particular structures that have problems with zebra mussels infestations are water intake structures such as drinking water, industrial and power generating plants. These facilities usually have submerged pipelines that bring water to the plant from a water source such as a lake or stream. Water intakes of small diameter, 60 to 180 centimeters, and great length (over several hundred meters) are particularly vulnerable to mussel infestation. Most water intakes are disposed within a crib designed to prevent large debris from being suctioned into the intake.

Normally, water flows through the crib and intake, to a shore side pumping station. Adult zebra mussels easily clog and close the gaps in the crib and decrease the volume of water drawn to the pumping station. Depending upon the depth of the crib, a secondary problem may be increased likelihood of icing about the crib due to the zebra mussel infestation since the relative water intake velocity is drastically increased (i.e. the frazil effect).

In the water intake itself, zebra mussels reduce the amount of water the pipe can carry while increasing the friction and turbulence of the flow by increasing the roughness of the pipe surface. With larger zebra mussel infestations, additional problems occur such as the lowling of filters and pumps as clusters of mussels break off from the pipe and travel downstream. Rotting flesh of dead zebra mussels present in the water intake may increase odor, taste and bacteria levels in the water.

Other structures commonly infested by zebra mussels are industrial and power generation cooling systems. A problem with heating and cooling systems, that magnifies the harm of zebra mussels, is of scale that normally forms on heat exchange surfaces. This scale creates an opportunity for the zebra mussels to settle and attach, particularly into the cracks and crevices in the scale. At times, the mussels cause quantities of scale to separate from the heat exchange surfaces, causing fouling and other problems downstream in the system.

Current methods of treating zebra mussel infestations include mechanical, chemical or non-chemical methods. Mechanical cleaning is the most conventional treatment for reducing zebra mussel numbers. Typical mechanical cleaning agents include filters to strain the mussels from the water or mechanical "pigs" or scrubbers to scrape mussels and other debris from the interior of the pipelines. Mechanical filtering of water is effective but at certain times in the zebra mussel life span, the mussels are able to pass through the filter and survive behind the filter. Mechanical filtration or scraping cause problems in that when the filters become clogged, additional service is needed to clean the filters while the industrial plants or water feed systems may need to be taken off line for such maintenance.

Another current treatment is that of chemical killing agents such as chlorine, ozone, and other oxidizing chemicals added to the infested waters. Chlorine has been used for years in Europe to control zebra mussel infestations. A major advantage offered by chemical treatments is that they can be engineered to protect the entire water system from the water intake to the end of the system. Other types of treatment include the use of a hot water bath (i.e. thermal treatment), electric shock, and ultraviolet light.

A number of problems have persisted with the previous chemical treatment methods. The most common chemicals, chlorine and ozone, have a disadvantage in that they are toxic materials to most lifeforms. Various government agencies are looking at new discharge limits to reduce or eliminate the release of these chemicals into the water supply and environment. Further, these toxic chemicals may kill off beneficial animals. Additionally, treatment costs are not constant because various uncontrollable environmental factors affect the toxicity of the chemicals, particularly water temperature, pH, dilution and organic or inorganic compounds present in the source of water, such as the reducing agents, $S^{2-}$ $Fe^{2+}$, $MN^{2+}$ and $NO^{2-}$. Thermal treatment, while effective, may be prohibited by new government regulations on thermal water release, while some facilities have no capacity to generate or backflush with the large quantities of hot water needed to kill zebra mussels.

The present invention is directed to overcoming the aforementioned problems associated with prior methods of zebra mussel growth control.

SUMMARY OF THE INVENTION

The present invention overcomes the problems and disadvantages of the prior art by providing an apparatus and method for controlling the growth of zebra mussels by treating their habitat with water that has been passed through a magnetic field. In accordance with the apparatus and method of the present invention, zebra mussel growth may be controlled or reduced in structures such as water intake pipes, industrial and domestic water handling facilities such as power plants, utilities and municipal drinking water stations.

Generally, the invention provides a method and apparatus to reduce the growth of zebra mussels by providing a first volume of water containing zebra mussels and treating a portion of the volume of water by passing it through a magnetic field. The magnetically treated portion is then mixed back into the first volume of water where growth of the zebra mussels is reduced. The greater the flux or density the magnetic field the water is passed through, along with a greater ratio of treated water to untreated water, the greater the effectiveness of treatment.

Types of treatments to which water having zebra mussel infestations may be categorized are batch treatments or injection treatments. Batch treatment (or sometimes called a feedback treatment) takes a portion of the water out of the zebra mussel environment, treats it magnetically through the magnetic water treatment unit, and replaces it back into the host environment. Examples of this type of treatment may be a water tank to which a pump and magnetic water unit are connected in series. Other types of batch treatments may be utilized as in a water jacket of an engine, a boat bilge area or numerous other industrial and domestic systems.

An injection treatment occurs in the system when a separate source of water is treated and injected into the zebra mussel host environment. Examples of this may include industrial water intakes from a raw water source such as a lake or stream, utility cooling towers or the outside of a boat hull. Injection treatment may be utilized to treat both the inside of a water intake pipe and alternatively treat the volume of water around the pipe opening.

An advantage of the magnetic water treatment of the present invention is that it reduces growth of zebra mussels without adding chemicals to the water. The effectiveness of the magnetically treated water is time dependent, the effectiveness decreasing with time. No pollution or permanent change to the water supply is created since the water reverts to its original state and condition after an amount of time.

A further advantage of the magnetic water treatment of the present invention is that the effect on zebra mussels is noticeable almost instantly. Although not entirely understood, the magnetic water treatment appears to interfere with the zebra mussels ability to extract needed nutrients from the water. During treatment, the zebra mussels "clam up" or close, while upon dissection, noticeable biological changes of the mussels are evident.

The invention, in one form thereof, provides a method for treating water to reduce the growth of zebra mussels. A volume of water containing zebra mussels is provided, with at least a portion of the water treated by passing it through a magnetic field. The treated portion is then mixed back into the original volume of water, whereby the growth of zebra mussels is reduced. The treatment may include passing the portion of water through a plurality of magnetic fields having alternating polarity.

In another form of the invention, an apparatus is provided for reducing the growth of zebra mussels in water within a containment zone. The apparatus includes a water conduit having an inlet and outlet in communication with the containment zone. A pump is connected to the water conduit for pumping water from the containment zone through the water conduit and back to the zone. A water treatment unit is disposed in the water conduit including a magnet for creating a magnetic field through which water in the water line is subjected, so magnetically treated water may enter the containment zone and reduce the growth of zebra mussels. The magnetic water treatment unit may comprise a plurality of permanent magnets having a sleeve means for shielding each permanent magnet from the others. This shielding sleeve collects the lines of magnetic force produced by the magnet to maximize the magnetic lines of force that perpendicularly intersect the direction of water flow through the water line. In another form of the invention, the apparatus provides a water treatment unit that includes a plurality of permanent magnets, the unit including a sleeve shielding each permanent magnet from the other permanent magnets and collecting the lines of magnetic force produced by the shielded permanent magnet to maximize the lines of force that intersect perpendicularly to the directional flow of the water through the water line.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
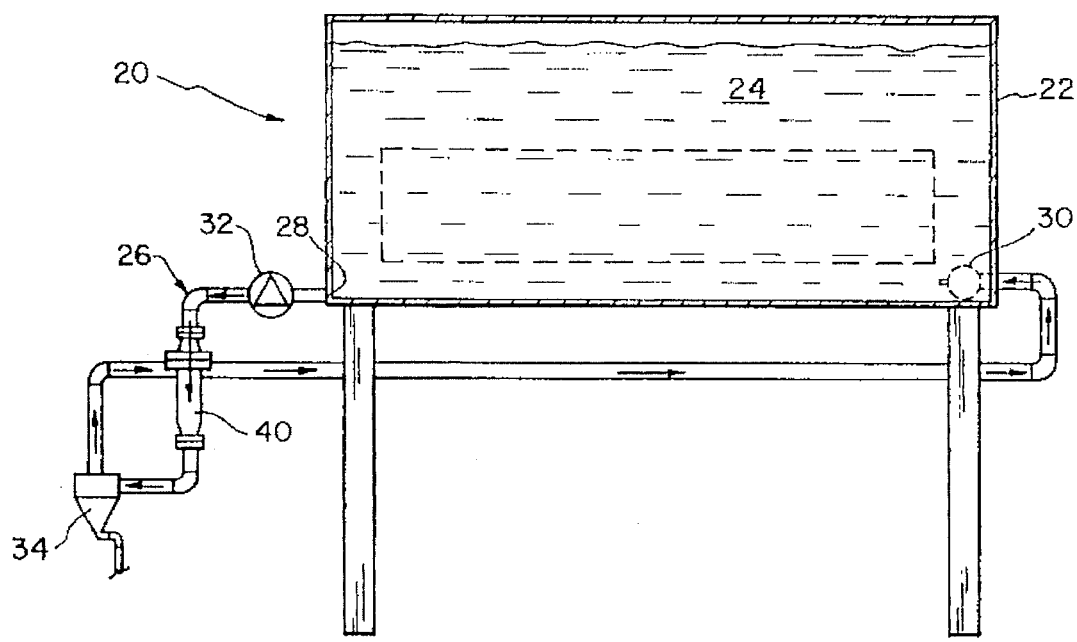
FIG. 1 is an elevational view of one embodiment of the present invention.

An embodiment of the invention is shown in FIG. 1. There is shown a generic batch treatment unit 20 having a tank 22 filled with a volume of water 24 in which initially, zebra mussels are growing. Unit 20 includes a water line 26 having both an inlet 28 and an outlet 30. A water pump 32 is disposed in water line 26 for pumping water from water inlet 28 through pipe 26 and out water outlet 30. As shown in FIG. 1, a magnetic water treatment unit 40 is disposed within water line 26 for magnetically treating water flowing through water line 26. Downstream from water stream unit 40 is located a hydrocyclone 34 for removing entrained sludge or other insoluble particles within water line 26. For proper operation of the invention, a hydrocyclone is not required but may increase the effectiveness of the treatment. The particulars of the magnetic water treatment unit 40 will be discussed below.

Figure 2:
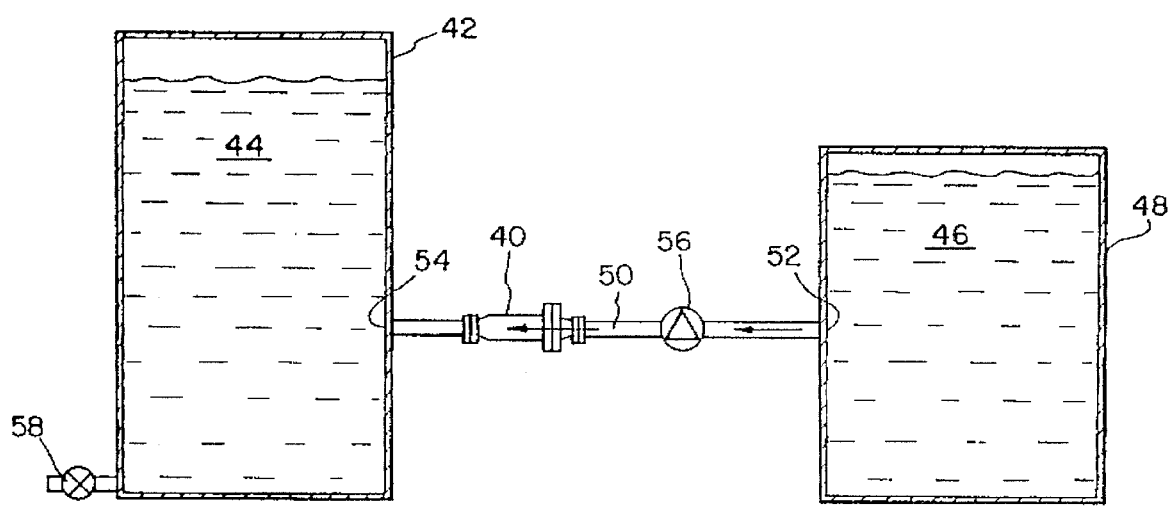
FIG. 2 is an elevational view of another embodiment of the present invention.

FIG. 2 is another embodiment showing use of injection treatment, reducing the growth of zebra mussels in a volume of water. As shown in FIG. 2, a containment tank 42 includes a volume of zebra mussel infested water 44. In regards to the injection treatment, a second supply of water 46, as shown in tank 48, is connected by a water line 50 to tank 42. Water line 50 includes an inlet 52 communicating with tank 48 and an outlet 54 in communication with tank 42. Pump 56 is disposed within water line 50 to control the flow of water 46 into tank 42. A magnetic water treatment unit 40 is disposed downstream of pump 56 within water line 50 so that water 46 pumped from tank 48 will be magnetically treated and injected into zebra mussel infested water 44 within tank 42. Tank 42 further includes a drain valve 58 to remove dead zebra mussels and other settled debris within tank 42.

Although the previous two embodiments show the magnetic treatment unit 40 downstream from pumps 32 and 56, alternatively, units 40 may be disposed upstream.

Both FIGS. 1 and 2 show tank style embodiments in which volumes of water have been infested with zebra mussels. The present method and apparatus operate without regard to the shape of the volume of water treated. Pipes, vessels, boilers, containment and even open water may be equivalently treated with the disclosed method and apparatus.

Figure 3:
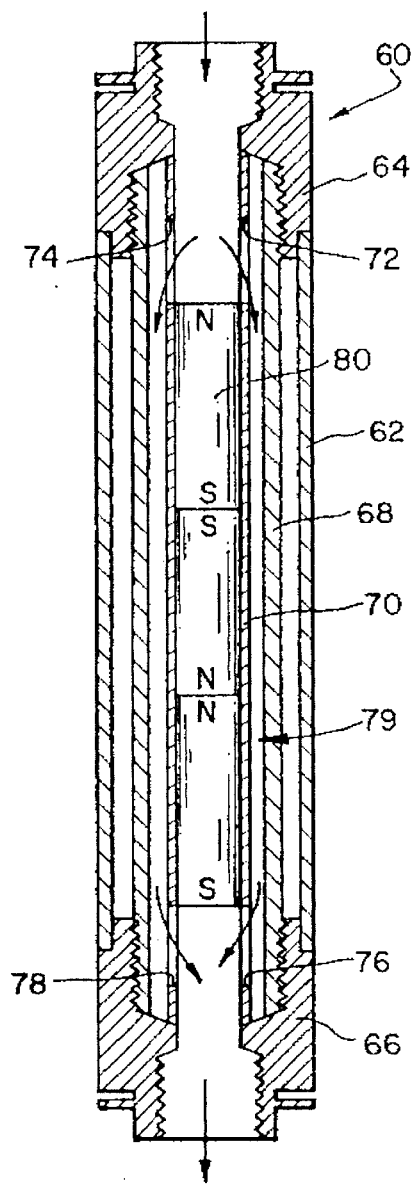
FIG. 3 is a longitudinal section view of a magnetic treatment unit utilized in one form of the present invention.

The key to the water treatment system of the present invention is that of creating a magnetic field through which water may pass. The magnetic water treatment unit 40 as shown in FIG. 3 is similar to the magnetic water treatment units shown in any one of the following U.S. patents hereby incorporated by reference: U.S. Pat. Nos. 3,951,807, 4050, 426, 4,153,559, 4,299,700, 4,320,003, 4,357,237 and 4,430, 785.

FIG. 3 discloses a single magnetic core unit 60 useful in low volume magnetic treatment of water. A single core unit includes an outer casing 62 made of non-magnetic material such as copper and fittings 64 and 66 made of non-magnetic materials such as brass. For purposes of the present description, "nonmagnetic" means materials having a very low magnetic permeability and virtually no ferromagnetic characteristics, such as copper, brass, PVC, nylon and Delrin, for example. "Magnetic" materials are those exhibiting high magnetic permeability such as iron and steel.

Inner casing 68 is a threaded galvanized ½ inch steel pipe with an inner diameter of approximately 0.633 inches. Casing 68 is made of a ferromagnetic material having a high magnetic permeability such as preferably galvanized iron or steel, although other materials may be used. Inner casing 68 has an outside diameter less than the inside diameter of outer casing 62 and is uniformly spaced therefrom by threaded attachment to fittings 64 and 66.

Positioned within inner casing 68 is a tube 70 of non-magnetic material such as copper, which is open at both ends and has a pair of apertures 72, 74 and 76, 78 therein. Tube 70 within inner casing 68 forms an annular chamber 79. Apertures 72 and 74 are transversely aligned along an axis which is rotated 90° from the axis along which the apertures 76 and 78 are aligned. This causes the water which enters one end of unit 60 to make a 90° turn upon the longitudinal axis before it exits from the opposite end. Tube 70 has an outer diameter, in a preferred embodiment, of approximately 0.500 inches and inner diameter of 0.400 inches.

Magnetic 80 is disposed within tube 70 and is preferably approximately 0.375 inches in diameter, 6.0 inches in length and with a pole spacing of approximately 2.0 inches. The elongated permanent magnet 80, preferably having a composition of cobalt, nickel, aluminum, copper and iron, is magnetized along its longitudinal axis to have a plurality of longitudinally spaced apart poles of alternating polarity represented by the symbols "N" and "S". Magnet 80 is substantially homogeneous in composition and in the embodiment illustrated, comprises three magnetic domains extending transversely throughout the magnet, having their magnet moments oppositely aligned such that alternate north and south poles exist along the length of the magnet 80. A magnet such as this may be produced by imposing on a bar of magnetic material two longitudinally displaced static magnetic fields of opposite polarity. The number of poles for a particular magnet depends to a great extent on the size of the device and the gallon per hour capacity desired, so that in the case of a very small capacity device, a magnet having only 3 dipoles may be most efficient. Magnets with a different number of dipoles may also be used.

Magnet 80 may be provided with a pair of resilient plastic end caps which are compressed against tube 70 so as to frictionally retain magnet 80 in place as in known in the art. Alternatively, other ways of attaching magnet 80 in tube 70 may be used, such as epoxy or interference fitting.

Figure 7:
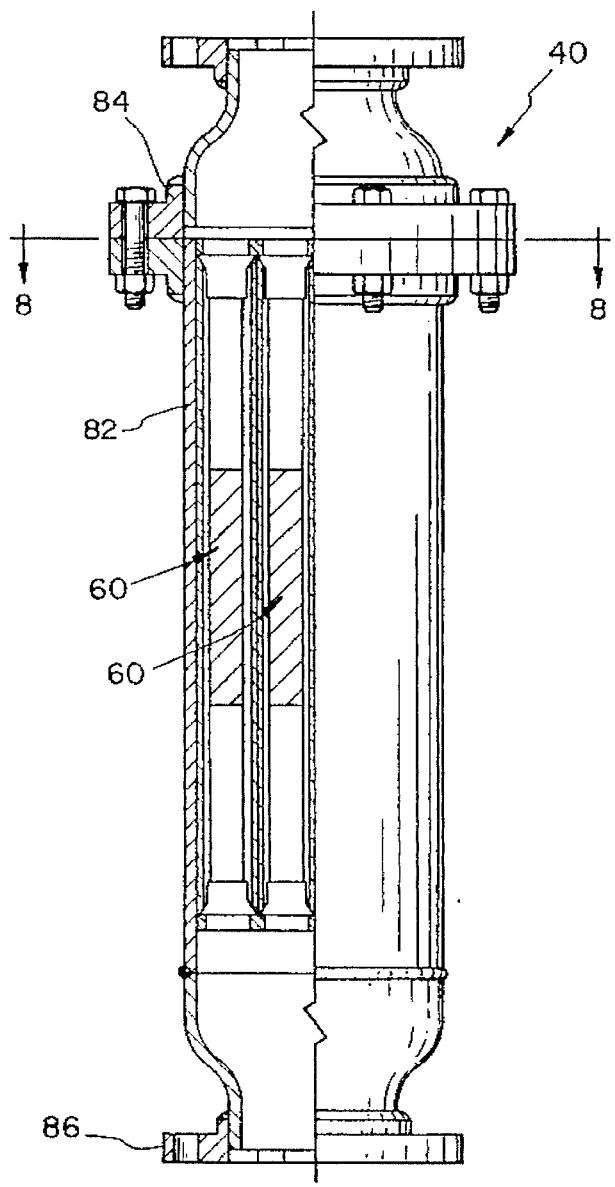
FIG. 7 is a partial sectional view of one form of the magnetic treatment unit of the present invention utilizing a plurality of magnetic units.
Figure 8:
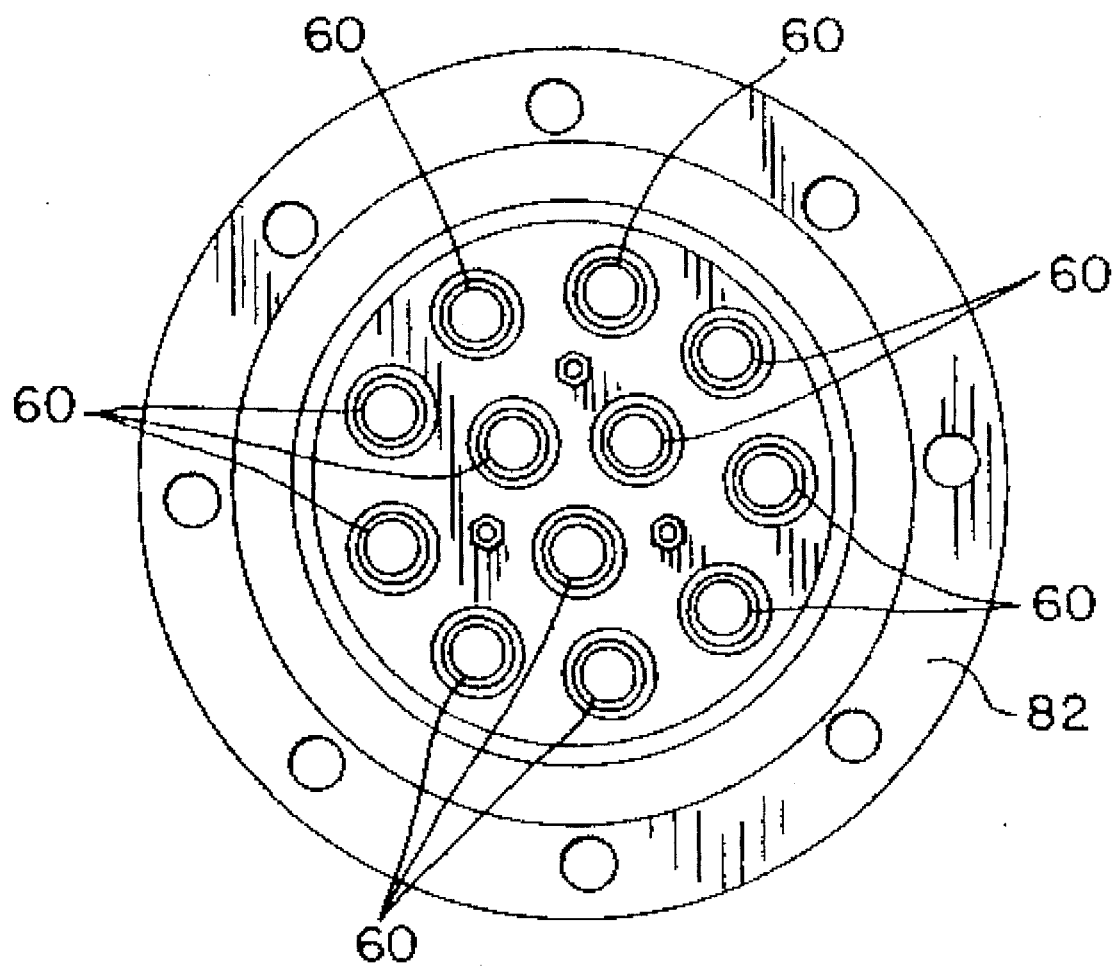
FIG. 8 is a sectional view of the magnetic treatment unit of FIG. 7 taken along line 8—8 and viewed in the direction of the arrows.

The structure of magnetic core unit 60 is designed to concentrate the magnetic field produced by magnet 80 in the annular chamber 79 immediately adjacent thereto, and at the same time, insulate this field from the supporting structure to external ferromagnetic objects which may come in contact with the device. Due to the high permeability of tube 70, the flux produced by magnet 80 will extend radially outward therefrom, pass through tube 70 and return to magnet 80 without straying from chamber 79. Inner casing 68 located about magnet 80 assists in containing the magnetic field. By thus containing the magnetic field, maximum efficiency of subjecting the water flowing through the device to the magnetic field is achieved. Containment of the magnetic field is further enhanced through use of non-magnetic materials for outer casing 62, fitting 64 and 66 (as described in U.S. Pat. No. 4,299,700). Because single magnetic core unit 60 is a low capacity device, a magnetic water treatment unit 40 of the present device, as shown in FIG. 7, includes a plurality of such units 60 to increase the amount of treated water. As shown in FIG. 7, it is possible to arrange a plurality of single magnetic core units 60 together. Although the magnetic water treatment unit 40, shown in FIGS. 7 and 8, includes (12) magnetic core units 60, depending upon the demand for treated water, this number may vary. Unit 40 includes a 82 to hold core units 60 parallel to each other. A top flange 84 is bolted to housing 82 and connected to a source of water. A bottom flange 86 is connected to a water return line to the area of Zebra mussel infestation.

The embodiments in which the present invention may be utilized are quite diverse ranging from marine applications, to those for water tanks, water intakes, utility and industrial cooling towers, municipal water treatment plants and even open water systems. An embodiment as shown in FIG. 4 discloses a water intake 90, disposed in a lake or river bed 92, utilizing water 94 which may be infested with zebra mussels.

Figure 4:
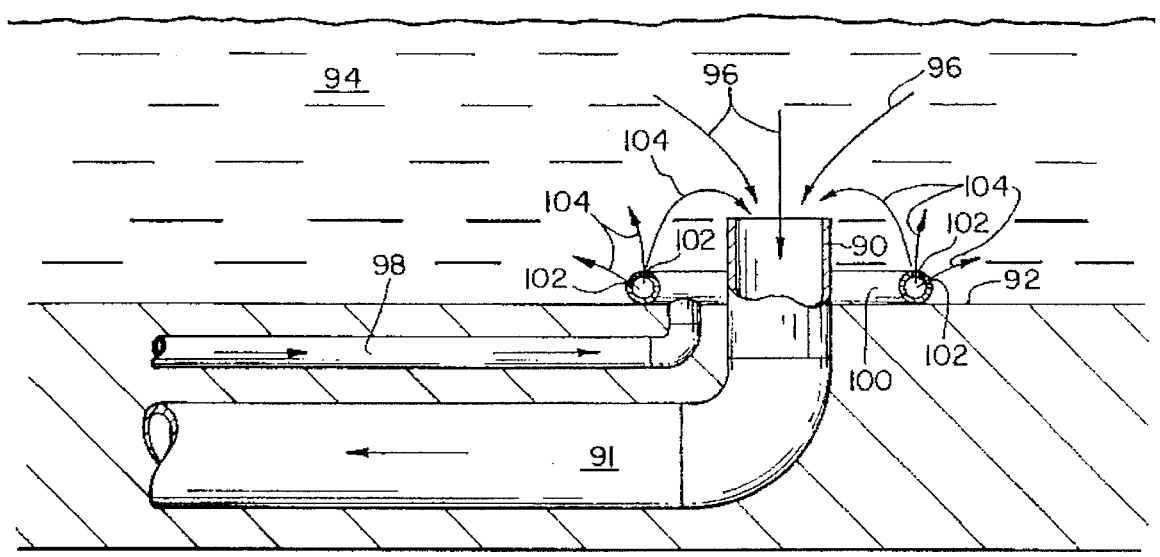
FIG. 4 is a sectional view of one embodiment of the present invention utilized to treat water at a submerged water intake.

As shown in FIG. 4, water intake suctions water 94 through water line 91 to an onshore facility (not shown). Arrows 96 indicate the flow of water 94 into intake 90. For the proper growth control of zebra mussels, treated water is pumped back to water intake 90 via a treated water line 98. Treated water line 98 contains water treated with a magnetic water treatment unit 40 located in the onshore facility. A collar 100 is disposed about water intake 90 and connected to treated water line 98. Collar 100 includes a plurality of exit ports 102 through which the magnetically treated water flows back around water intake 90. Arrows 104 show the flow of treated water out of collar 100 through exit ports 102 and back around bed 92 and intake 90. This treatment of the water about water intake 90 will prevent zebra mussel infiltration and maintain a clear space about water intake 90 without growth of a zebra mussel colony. Alternatively and equivalently, magnetically treated water may be sprayed directly into the water intake 90 to thereby directly treat all areas downstream within water intake 90. Other variations of injecting the magnetically treated water in the intake may also be utilized.

Figure 5:
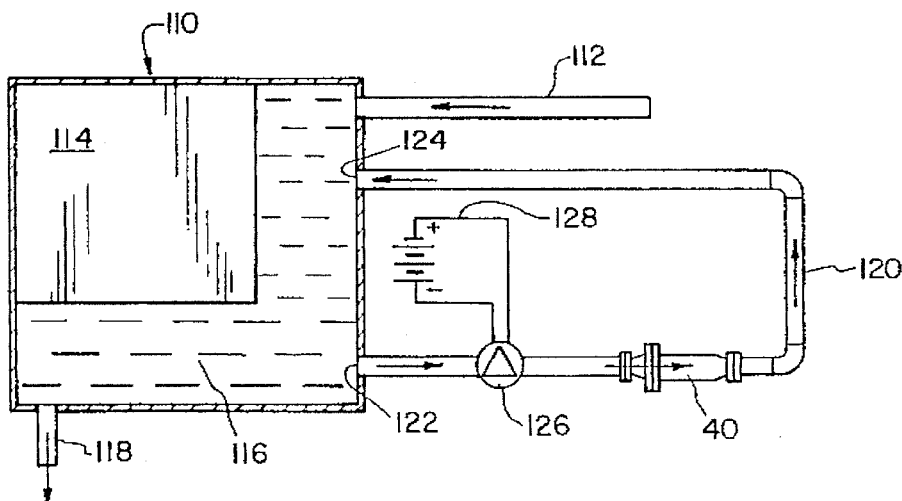
FIG. 5 is a diagrammatic view of another embodiment of the present invention utilized to treat water within a water cooled engine.

Another embodiment of the invention is shown in FIG. 5 in which an engine, such as a marine engine 110, is protected from zebra mussel infestation by means of the present invention. Marine engine 110 includes a cold water intake 112 that utilizes untreated water containing zebra mussels as coolant. Box 114 is used to generically identify standard portions of a marine engine such as a piston-cylinder combination, crankshaft, and associated electronics without detail. These conventional portions of marine engine 110 are not part of the present invention. The important portion of engine 110 is that of water jacket 116 which is a conventional heat exchanger water jacket or radiator to remove heat generated by engine portion 114. Coolant water that enters water jacket 116 through cold water inlet 112 is allowed to flow through 7° hot water exhaust 118 in a known manner. Because engine 110 is an open system with water jacket 116 open to the environment and specifically open to the zebra mussel infested water in which the boat operates, zebra mussels may be able to travel through cold water inlet 112 and reproduce within water jacket 116 during lengthy periods of engine inactivity.

The invention, in one form, causes magnetically treated water, in the sense of a batch or feedback system, to treat the water within water jacket 116 under all engine operating conditions. A water line 120 is connected through outlet 124 to water jacket 116 to make a feedback loop such that inlet 122 allows water from water jacket 116 to enter water line 120 while water exits water line 120 through outlet 124 back into water jacket 116. Disposed within water line 120 is magnetic water treatment unit 40 constructed to ensure that the water flowing through water line 120 is sufficiently treated so that zebra mussel growth within water jacket 116 is eliminated. A pump 126 is disposed within water line 120 to maintain a constant flow of water through water line 120. For operation of the present invention when engine 110 is not running, pump 126 may be attached to an energy source such as a solar cell or panel 128 that generates electricity on exposure to light. In this way, solar cell or panel 128 may maintain pump 126 in operation at all times, independent of the operation of marine engine 110. Solar cell or panel 128 may be sized, as known in the art, for the desired current needed by pump 126. Alternatively, unit 40 may simply be disposed in line with water inlet 112.

Figure 6:
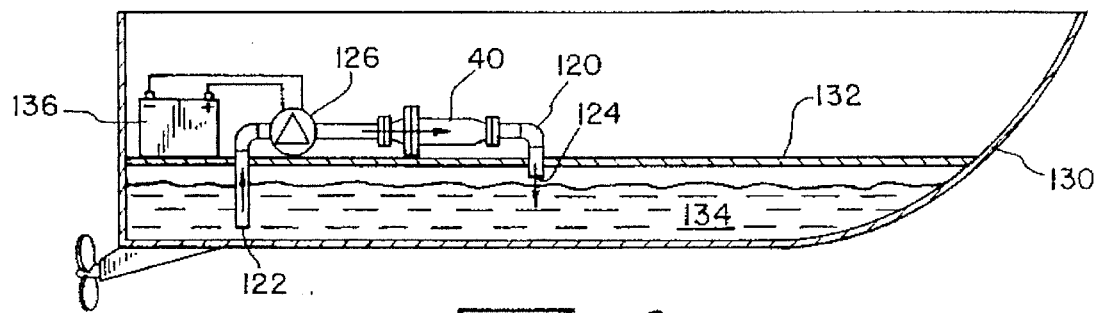
FIG. 6 is a diagrammatic view of another embodiment of the present invention utilized to treat water within a boat.

Yet another embodiment of the invention within a boat 130 as shown in FIG. 6. Boat 130 includes a deck 132 under which a volume of bilge water 134 is located. It has been found that this bilge water 134 is a location in which zebra mussel infestations are quite common. This embodiment uses the same apparatus as that of FIG. 5 and operates in a similar fashion. Instead of a solar panel 128 for power, a conventional battery 136 may be utilized.

The invention possibly operates by changing the structure of the water on the macro scale, thereby changing its physical, chemical and biological properties, so that the growth of organisms in contact with this treated water may be altered.

It is know that zebra mussels are filter feeding mollusks as opposed to bottom scrapers and grazers. Their feeding mechanism is fairly complicated. Basically, water is siphoned into the body cavity of the mussel where it is circulated over its ctenidia. The ctenidial filaments, by way of synchronized ciliary beating, create water currents for respiration and feeding. The ctenidia is a surface in which particles, suspended in the water, including fluid and other nutrients are sorted. Frontal cilia, at the ridges of the ctenidium, help sort the particles along the surface. Separation is done by size alone, sorting valuable food from inedible particles. It has been known that ciliary activity can disclose information of the water quality in which they live.

Feeding is a necessary requirement for growth and eventual reproduction of the mussels. Without the optimal nutrient conditions even other determining factors in the growth equation cannot overcome a nutrient poor diet. The inability to consume and assimilate proper nutrient demands (bioenergetics) can be externally observed through reduced growth rates.

Further, it is known that the growth of all organisms depends upon the essential presence of the proper chemical materials within the growth medium. Thus, eliminating the presence of an essential growth factor will result in the cessation of growth, which, if sustained over a prolonged period of time, usually will result in organism death. This is one possible explanation for the effect of magnetized water on zebra mussels.

The magnetic treatment of water alters the chemical macrostructure of water. This altered water structure, which is in effect a new solvent, causes chemical equilibria to shift, changing the concentration of existing chemical species and creating a new equilibrium system. It is theorized that chemical species essential for zebra mussel growth are reduced while other chemical species, some of them toxic to zebra mussels, are increased. Test results indicate that zebra mussel growth is retarded and processes essential for zebra mussel reproduction, veliger settlement and subsequent growth, and continued zebra mussel viability are interdicted by operation of the present invention. Thus, damage to water systems due to zebra mussel growth maybe reduced or eliminated.

Although the direct reason why zebra mussel growth is inhibited is unknown, test results have indicated that some activity is taking place to kill and retard the growth of zebra mussels exposed to the magnetically treated water of the present invention.

It is known that zebra mussels have a prodigious requirement for the element calcium and a substantial requirement for the element magnesium. They also have a high phosphorus requirement, a portion of which is found in an unusual group of biochemicals called phosphonolipids, which are polar fats containing the rare carbon-phosphorus chemical bond particular to pelagic organisms. It is believed, that, consistent with what is known about other biological systems, the proper chemical form of these elements is required in the growth medium for proper zebra mussel growth. It is believed further, that zebra mussels can only utilize certain specific complexes of these elements for growth. The presence of the wrong complex in the medium will not permit growth, even though, in a gross chemical quantitation that depends only upon the presence of a particular atom, such as would be obtained through inductively-coupled plasma spectrometry, the concentration of the element may appear to be adequate.

Use of the invention on zebra mussels has been determined to slow their growth with an increase in mortality. Additionally, the present invention appears to also effect the shells of the zebra mussel making them more fragile than normal.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for reducing growth of zebra mussels in water in a containment zone, said apparatus comprising:

means defining said containment zone;

a supply of water including zebra mussels disposed in said containment zone;

a water conduit having an inlet and an outlet in communication with the containment zone;

a pump connected to said water conduit for pumping water from said containment zone from said inlet, through said water conduit, and into the containment zone through said outlet; and a water treatment unit disposed in said water conduit between said pump and said outlet, said unit including a tubular casing, a magnet disposed within said tubular casing and defining a chamber therewith, means for serially connecting said chamber with said water conduit, wherein said magnet is configured and arranged to create a magnetic field of alternating polarity within said chamber through which water in said water conduit passes, whereby the magnetically treated water enters said containment zone and reduces the growth of zebra mussels therein.

2. The apparatus of claim 1 in which said pump is powered by a solar cell that generates electricity on exposure to light.

3. The apparatus of claim 1 in which said magnet comprises a permanent magnet.

4. The apparatus of claim 3 in which said unit includes a plurality of permanent magnets, each said magnet including a respective said tubular casing, wherein each said tubular casing is adapted to shield a respective said permanent magnet from the other said permanent magnets and collecting lines of magnetic force produced by said magnet to maximize the lines of force that intersect perpendicularly to the direction of flow of the water through said water line.

5. The apparatus of claim 1 in which said containment zone comprises an engine.

6. The apparatus of claim 1 in which said containment zone comprises a boat.

7. The apparatus of claim 1 in which said pump is powered by solar power.

8. The apparatus of claim 1 in which said containment zone comprises a water intake pipe.

* * * * *